US007517508B2

(12) United States Patent
Bray (10) Patent No.: US 7,517,508 B2
(45) Date of Patent: Apr. 14, 2009

(54) METHOD OF SEPARATING AND PURIFYING YTTRIUM-90 FROM STRONTIUM-90

(75) Inventor: Lane Allan Bray, Richland, WA (US)

(73) Assignee: IsoRay Medical, Inc., Richland, WA (US)

( * ) Notice: Subject to any disclaimer, the term of this patent is extended or adjusted under 35 U.S.C. 154(b) by 724 days.

(21) Appl. No.: 11/189,131

(22) Filed: Jul. 25, 2005

(65) Prior Publication Data

US 2006/0018813 A1 Jan. 26, 2006

Related U.S. Application Data

(60) Provisional application No. 60/591,360, filed on Jul. 26, 2004, provisional application No. 60/653,668, filed on Feb. 16, 2005.

(51) Int. Cl.
*G21F 9/00* (2006.01)
(52) U.S. Cl. .......................... 423/2; 423/249; 423/157; 423/70
(58) Field of Classification Search .................. 423/2, 423/70, 157, 249
See application file for complete search history.

(56) References Cited

U.S. PATENT DOCUMENTS

| | | | |
|---|---|---|---|
| 1,753,287 A | 4/1930 | Failla | |
| 3,218,123 A * | 11/1965 | Davis, Jr. et al. ................ | 423/2 |
| 3,301,789 A * | 1/1967 | Bray .......................... | 252/644 |
| 3,351,049 A | 11/1967 | Lawrence ................... | 128/1.2 |
| 3,706,689 A | 12/1972 | Haskins ................ | 252/301.1 R |
| 4,323,055 A | 4/1982 | Kubiatowicz ................ | 128/1.2 |
| 4,702,228 A | 10/1987 | Russell, Jr. et al. ........... | 128/1.2 |
| 4,784,116 A | 11/1988 | Russell, Jr. et al. ........... | 128/1.2 |
| 4,891,165 A | 1/1990 | Suthanthiran ............... | 252/633 |
| 4,994,013 A | 2/1991 | Suthanthiran et al. .......... | 600/8 |
| 5,071,610 A | 12/1991 | Hagen et al. ................ | 264/120 |
| 5,154,897 A * | 10/1992 | Ehrhardt et al. ................ | 423/6 |
| 5,163,896 A | 11/1992 | Suthanthiran et al. .......... | 600/8 |
| 5,225,173 A * | 7/1993 | Wai .............................. | 423/2 |
| 5,342,283 A | 8/1994 | Good .......................... | 600/8 |
| 5,368,736 A | 11/1994 | Horwitz et al. ............. | 210/635 |
| 5,405,309 A | 4/1995 | Carden, Jr. ..................... | 600/3 |
| 5,494,647 A * | 2/1996 | Huntley .......................... | 423/2 |
| 5,512,256 A | 4/1996 | Bray et al. ..................... | 423/2 |
| 5,591,420 A | 1/1997 | Balmer ...................... | 423/700 |
| 5,683,345 A | 11/1997 | Waksman et al. .............. | 600/3 |
| 5,749,042 A | 5/1998 | Bray et al. ..................... | 423/2 |
| 5,899,882 A | 5/1999 | Waksman et al. ............. | 604/96 |
| 6,060,036 A | 5/2000 | Armini ...................... | 424/1.29 |
| 6,066,302 A | 5/2000 | Bray .......................... | 423/2 |
| 6,099,457 A | 8/2000 | Good .......................... | 600/8 |
| 6,099,458 A | 8/2000 | Robertson ..................... | 600/8 |
| 6,139,749 A | 10/2000 | Goken et al. ................ | 210/651 |
| 6,306,074 B1 | 10/2001 | Waksman et al. .............. | 600/7 |
| 6,309,614 B1 | 10/2001 | Horwitz et al. ................ | 423/2 |
| 6,351,049 B1 | 2/2002 | Chassoulier et al. ........ | 310/90.5 |
| 6,403,916 B1 | 6/2002 | Spooner et al. ........ | 219/121.63 |
| 6,458,070 B1 | 10/2002 | Waksman et al. .............. | 600/3 |
| 6,471,632 B1 | 10/2002 | Jahrmarkt et al. .............. | 600/8 |
| 6,479,920 B1 | 11/2002 | Lal et al. ..................... | 310/309 |
| 6,485,406 B1 | 11/2002 | Ziegler et al. .................. | 600/8 |
| 6,503,185 B1 | 1/2003 | Waksman et al. .............. | 600/3 |
| 6,554,756 B1 | 4/2003 | Schaart .......................... | 600/3 |
| 6,589,502 B1 | 7/2003 | Coniglione et al. ........ | 424/1.25 |
| 6,608,277 B2 | 8/2003 | Spooner et al. ........ | 219/121.63 |
| 6,666,811 B1 | 12/2003 | Good .......................... | 600/8 |
| 6,679,824 B1 | 1/2004 | Reed et al. ..................... | 600/7 |
| 6,689,043 B1 | 2/2004 | McIntire et al. ................ | 600/1 |
| 6,730,013 B1 | 5/2004 | Shank et al. ................... | 600/7 |
| 6,749,554 B1 | 6/2004 | Snow et al. ..................... | 600/3 |
| 6,821,242 B1 | 11/2004 | Waksman et al. .............. | 600/3 |
| 2002/0022781 A1 | 2/2002 | McIntire et al. ............. | 600/458 |
| 2002/0162828 A1 | 11/2002 | Spooner et al. ........ | 219/121.63 |
| 2003/0088146 A1 | 5/2003 | Slater et al. ..................... | 600/8 |
| 2003/0092959 A1 | 5/2003 | Slater et al. ..................... | 600/8 |
| 2003/0229259 A1 | 12/2003 | Waksman et al. .............. | 600/3 |
| 2004/0076579 A1 | 4/2004 | Coniglione et al. ........ | 424/1.11 |
| 2004/0097779 A1 | 5/2004 | McIntire et al. ................ | 600/1 |
| 2004/0192999 A1 | 9/2004 | Waksman et al. .............. | 600/4 |
| 2004/0236169 A1 | 11/2004 | Slater et al. ..................... | 600/8 |
| 2004/0242953 A1 | 12/2004 | Good .......................... | 600/7 |
| 2006/0024223 A1 | 2/2006 | Bray et al. ..................... | 423/1 |
| 2006/0051269 A1 | 3/2006 | Bray et al. .................. | 423/158 |
| 2006/0167332 A1 | 7/2006 | Bray .......................... | 600/3 |

FOREIGN PATENT DOCUMENTS

| | | |
|---|---|---|
| JP | 01-254900 | 10/1989 |
| WO | WO 00/51136 | 8/2000 |
| WO | WO 01/80251 | 10/2001 |
| WO | WO 2004/053892 | 6/2004 |

OTHER PUBLICATIONS

Harper, P.V. et al., "Isotopes Decaying by Electron Capture: a New Modality in Brachytherapy," in *Proceedings of the International Conference on the Peaceful Uses of Atomic Energy*, Geneva Switzerland, 1958, pp. 417-422.

Kurath, D.E. et al., "Ion Exchange Removal of Cesium from Simulated and Actual Hanford Tanks 241-SY-101 and 241-SY-103," in *Proceedings of the International Topical Meeting on Nuclear and Hazardous Waste Management Spectrum '96*, Aug. 18-23, 1996, Seattle, Washington, American Nuclear Society, La Grange Park, IL, 1996, pp. 222-228.

(Continued)

*Primary Examiner*—Steven Bos
(74) *Attorney, Agent, or Firm*—Seed IP Law Group PLLC (57) ABSTRACT

The present invention provides a method of separating and purifying Yttrium-90 (Y-90) from Strontium-90 (Sr-90). In addition, a zirconium (Zr) clean-up step for the Y-90 is provided. Uses of the Y-90 purified by the method include cancer research and treatment. Y-90 is particularly useful in cell directed therapy, e.g., where the Y-90 is attached directly or indirectly to a targeting molecule such as an antibody.

12 Claims, 6 Drawing Sheets

OTHER PUBLICATIONS

Wike, J.S. et al., "Chemistry for Commercial Scale Production of Yttrium-90 for Medical Research," *International Journal of Radiation Applications and Instrumentation Part A*, 41(9): 861-865, 1990.

Armpilia, C.I. et al., "The Determination of Radiobiologically Optimized Half-lives for Radionuclides Used in Permanent Brachytherapy Implants," *Int. J. Radiation Oncology Biol. Phys.* 55(2): 378-385, 2003.

Malinin, A.B. et al., "Production of $^{131}$Cs Without a Carrier and Estimation of the Cross Section of the Reaction $^{131}$Cs (n,γ) $^{132}$Cs on Thermal Neutrons," *Soviet Radiochemistry 14*(6): 896-899, Nov.-Dec. 1972.

"Radiation protection—Sealed radioactive sources—Leakage test methods," International Standard ISO 9978, First Edition, Feb. 15, 1992.

"Radiation protection—Sealed radioactive sources—General requirements and classification," International Standard ISO 2919, Second Edition, Feb. 15, 1992.

R. Braun et al., "Crystalline Silicotitanates—Novel Commercial Cesium Ion Exchangers," UOP, pp. 1-12, pre-Nov. 2003.

Heintz, B.H. et al., "Comparison of I-125 sources used for permanent interstitial implants," *Med. Phys. 28*(4): 671-682, Apr. 2001.

Henschke, U.K. et al., "Cesium-131 Seeds for Permanent Implants," *Radiology 85*(6): 1117-1119, Dec. 1965.

Korb, L.J. et al., "Modern Brachytherapy for Localized Prostate Cancers: The Northwest Hospital (Seattle) Experience," *Review in Urology 3*(1): 51-60, Winter 2001.

3M Empore™ Rad Disks Product Listing, 1998. Available at http://www.mmm.com/empore, downloaded Mar. 11, 2004.

Balmer, M.L. et al., "New Silicotitanate Waste Forms: Development and Characterization," Interfacial and Processing Sciences Annual Report 1999. Available at http://www.pni.gov/microcats/aboutus/publications/microsystems/annual_report1999. Downloaded Sep. 19, 2004.

Hobbs, D.T., "Strategic Design and Optimization of Inorganic Sorbents for Cesium, Strontium, and Actinides," Westinghouse Savannah River Company Report WSRC-RP-2002-00337. Available at http://www.osti.gov/bridge. Downloaded Oct. 5, 2005.

Cary, A., "PNNL gel may charge drug obstacles," *Tri-City Herald*, Mar. 30, 2001. Available at http://www.tri-cityherald.com. Downloaded Oct. 8, 2004.

Hodgman, C.D. (ed.), "*Handbook of Chemistry and Physics, 31st edition,*" Chemical Rubber Publishing Co., Cleveland, OH, pp. 408-409, 1949.

Hodgman, C.D. (ed.), "*Handbook of Chemistry and Physics, 31st edition,*" Chemical Rubber Publishing Co., Cleveland, OH, pp. 524-525, 1949.

Kraus and Nelson, "Anion Exchange Studies of the Fission Products," in *Proc. Int. Conf. Peaceful Uses of Atomic Energy*, vol. 7, Geneve, 1955, pp. 113-125.

Naumann, R.A. et al., "Preparation of Radioactive Targets for Charged-Particle Nuclear Spectroscopy at the CERN-ISOLDE Project," *Nuclear Instruments and Methods in Physics Research B 26*: 59-64, 1987.

pSiVida Company, BioSilicon internet web pages. Available at http://www.psivida.com.au/text. Downloaded Nov. 3, 2004.

Smith, L.L. et al., "Application of Empore™ Strontium Rad Disks to the Analysis of Radiostrontium in Environmental Water Samples," *Radiochemica Acts 73*:165-170, 1996.

Willard and Goodspeed, "Separation of Strontium, Barium, and Lead from Calcium and Other Metals," *Industrial and Engineering Chemistry 8*(6):414-418, 1936.

\* cited by examiner

Figure 1: In-Growth of Y-90 from the Decay of Sr-90

Figure 2: Simulated "Milking" of Sr-90 for Y-90, 14-Day Cycle

Figure 3: Simulated "Milking" of Sr-90 for Y-90, 7-Day Cycle

Figure 4: Y/Sr Separations Process Flow Diagram

Figure 5: Fractional Recovery of Sr, Y and Zr as a Function of HNO3 Concentration

Figure 6: Concentration (μg/mL) of Sr, Y and Zr as a Function of Nitric Acid

METHOD OF SEPARATING AND PURIFYING YTTRIUM-90 FROM STRONTIUM-90

CROSS-REFERENCE TO RELATED APPLICATIONS

This application claims the benefit under 35 U.S.C. § 119 (e) of U.S. Provisional Patent Application No. 60/591,360 filed Jul. 26, 2004; and U.S. Provisional Patent Application No. 60/653,668 filed Feb. 16, 2005, where these two provisional applications are incorporated herein by reference in their entireties.

BACKGROUND OF THE INVENTION

1. Field of the Invention

The present invention relates generally to a method of separating Yttrium-90 (Y-90) from Strontium-90 (Sr-90). Uses of the Y-90 purified by the method include cancer research and treatment, such as for use in cell directed therapy.

2. Description of the Related Art

Radiation therapy (radiotherapy) refers to the treatment of diseases, including primarily the treatment of tumors such as cancer, with radiation. Radiotherapy is used to destroy malignant or unwanted tissue without causing excessive damage to the nearby healthy tissues.

Ionizing radiation can be used to selectively destroy cancerous cells contained within healthy tissue. Malignant cells are normally more sensitive to radiation than healthy cells. Therefore, by applying radiation of the correct amount over the ideal time period, it is possible to destroy all of the undesired cancer cells while saving or minimizing damage to the healthy tissue. For many decades, localized cancer has often been cured by the application of a carefully determined quantity of ionizing radiation during an appropriate period of time. Various methods have been developed for irradiating cancerous tissue while minimizing damage to the nearby healthy tissue. Such methods include the use of high-energy radiation beams from linear accelerators and other devices designed for use in external beam radiotherapy.

Another method of radiotherapy includes cell directed therapy. Here a targeting molecule, which is a binding partner of a molecule on a cancer cell, is radiolabeled. Examples of such targeting molecules include antibodies, e.g., monoclonal antibodies. The targeting molecule may be radiolabeled directly or indirectly via another molecule (e.g., chelating compound) that binds a radionuclide and is attached to the targeting molecule.

Yttrium-90 (Y-90) with a half-life of 64 hours is finding an increasing use in the treatment of various forms of cancer. The National Cancer Institute (NCI) has listed Y-90 as one of the top three radioactive isotopes being evaluated for use in cancer therapy. In fact Y-90 is the cancer-killing isotope used in the first FDA approved radiopharmaceutical used in cell directed therapy, with a specific use for the treatment of non-Hodgkin's Lymphoma. However, Y-90, a beta emitter, has important properties and is expected to be similarly used for many forms of cancer treatment. Medical researchers studying cancer treatment for the past 18 years have developed techniques using radioactive Y-90 labeled monoclonal antibodies to treat the fatal adult T-cell leukemia. Others are using Y-90 labeled antibodies for studies of tumor therapy of ovarian, colon and lymphatic cancers. The appropriate doses of chelate linked antibodies have been prepared and clinical protocols are being readied at major medical institutions such as the National Institute of Health (NIH), Bethesda, Md.; the Oak Ridge Associated Universities, Oak Ridge, Tenn.; and the University of California, Davis Medical Center, Sacramento, Calif.

With the increasing demand for Y-90, there is a need for a method capable of producing multi-curie quantities of Y-90 on a weekly basis. The Y-90 must be chemically and radio chemically pure. Sr-90/NY-90 separation factors less than $1 \times 10^{-6}$ (and preferably less than $1 \times 10^{-8}$) are required in order to reduce human exposure to long-lived Sr-90. In addition, numerous metal cations (e.g., iron, nickel, zirconium, etc.) interfere with Y-90 binding to monoclonal antibodies and should be reduced to less than 10 ppm (parts per million) per curie of Y-90.

Figure 1:
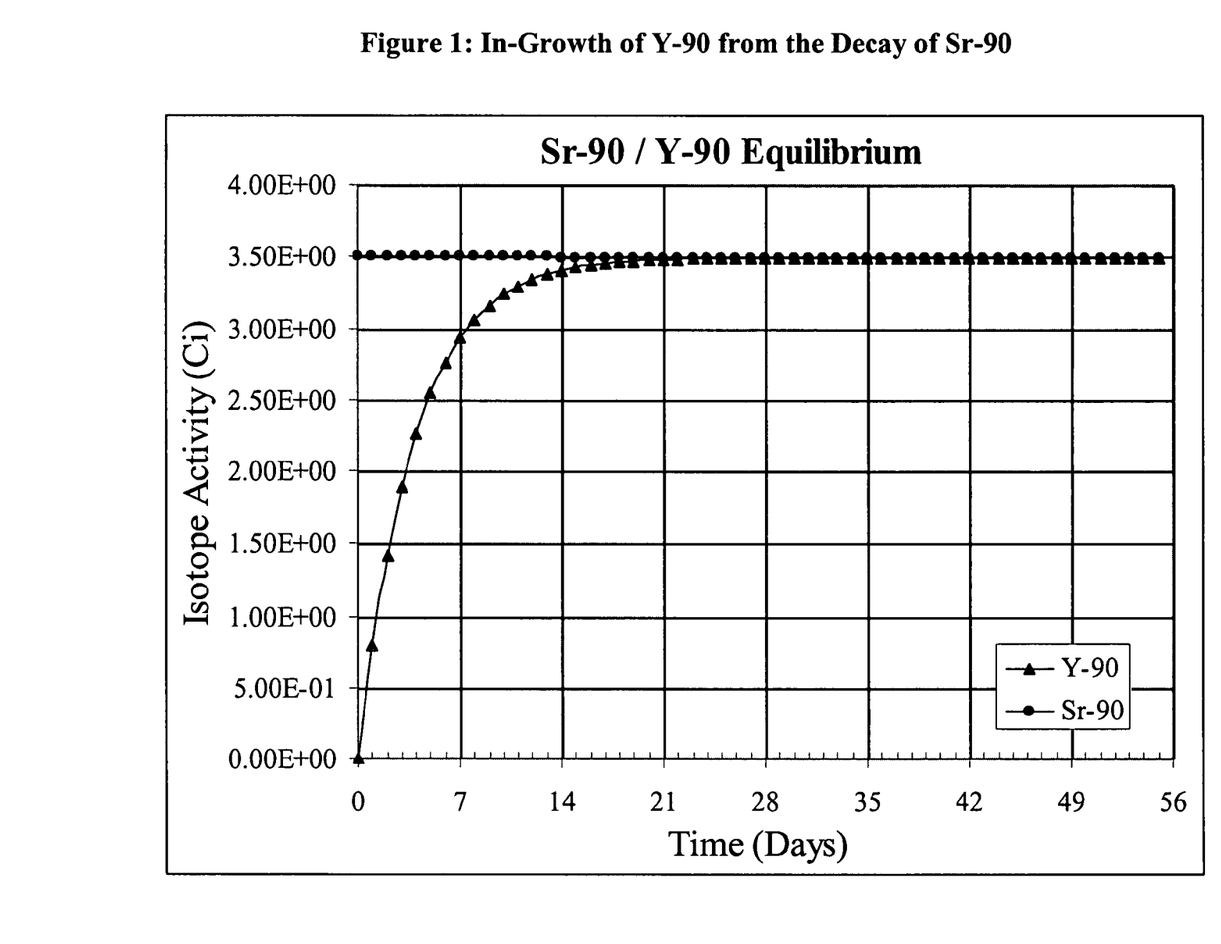
FIG. 1, entitled "In-Growth of Y-90 from the decay of Sr-90", is a diagram of the theoretical in-growth of Y-90 during 56-days, by Sr-90 decay after separation.
Figure 2:
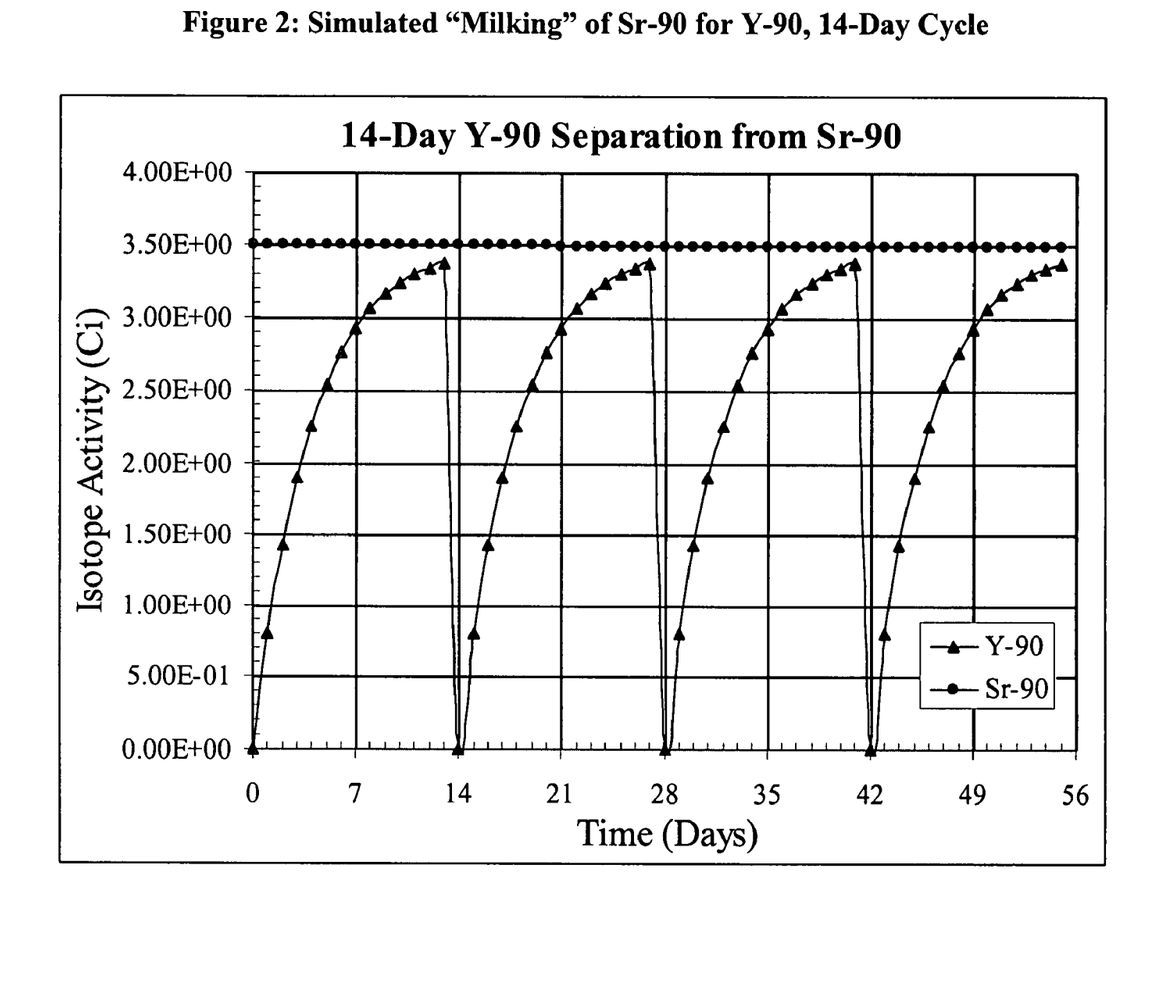
FIG. 2, entitled "Simulated 'Milking' of Sr-90 for Y-90, 14-Day Cycle", is a diagram of the buildup of Y-90 using a 14-day milking cycle, with the decay of Sr-90.
Figure 3:
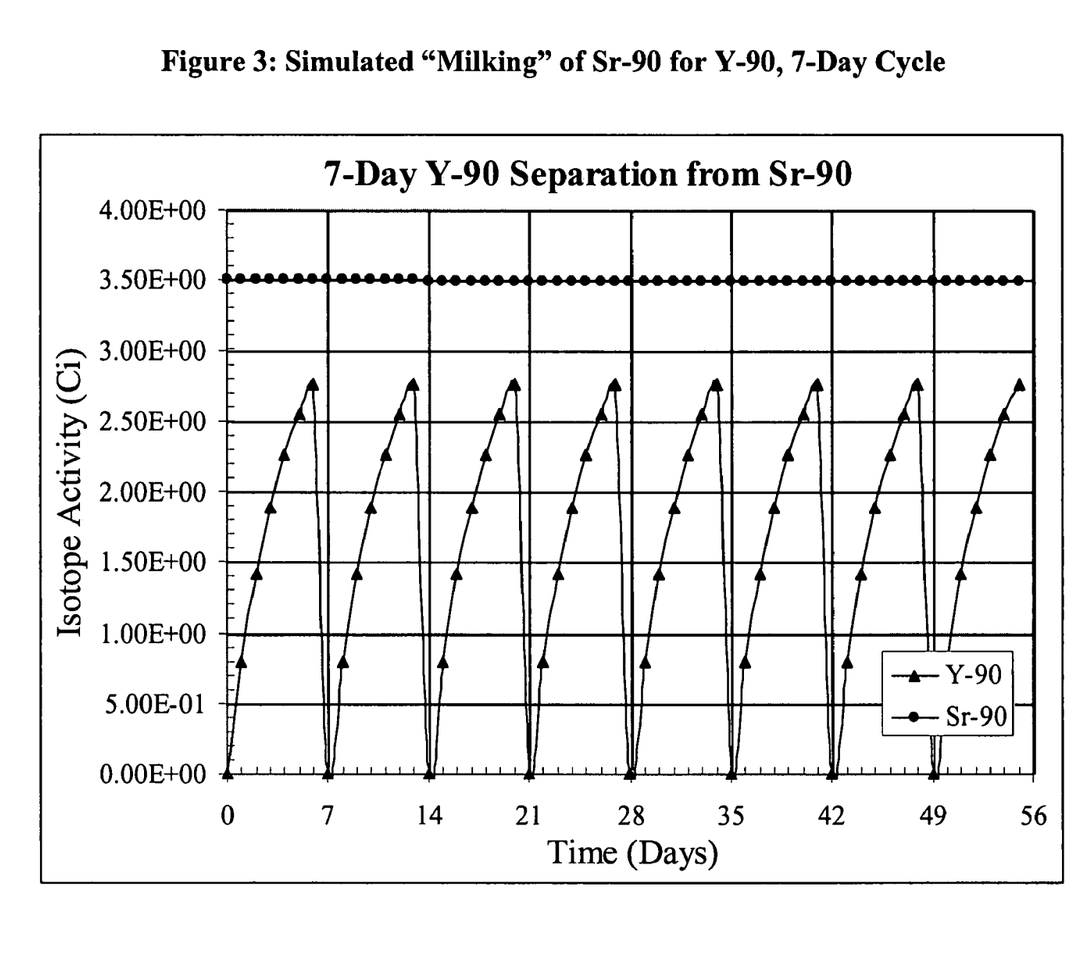
FIG. 3, entitled "Simulated 'Milking' of Sr-90 for Y-90, 7-Day Cycle", is a diagram of the buildup of Y-90 using a 7-day milking cycle, with the decay of Sr-90.

Yttrium-90 is produced by radioactive decay of Sr-90. A primary U.S. source of Y-90 is found in the nuclear fission product waste containing Sr-90, stored in highly radioactive waste tanks at the Hanford nuclear site near Richland, Wash. A representation of the in-growth of Y-90 from 3.5 Ci of Sr-90 as a function of time (assuming the original 3.5 Ci of Sr-90 is void of Y-90) is shown in FIG. 1. It requires between 14 and 21 days to come to equilibrium. To separate the Y-90, the Sr-90 target is "milked" multiple times over selected intervals, such as 14 days in which over 95% of the Y-90 is available, as depicted in FIG. 2. If the "cow" is milked on a 7-day interval (FIG. 3), the amount of available Y-90 drops to ~75% of the initial "cow" radioactivity. The "milking" interval selected is usually dependent on the demand for Y-90 and the amount of Sr-90 "cow" available.

In order to be useful, the separated Y-90 must be exceptionally pure, free from other metal ions and free from Sr-90, an extremely toxic bone-seeking isotope. The typical therapeutic dose of Y-90 labeled monoclonal antibodies is in the range of 100-300 millicuries of Y-90 per patient. Since an antibody is modified to contain only one molecule of chelating ligand per molecule of immunoprotein within the antibody, the total binding sites for metal ions are limited to about $7 \times 10^{-9}$ moles on 1 mg of chelate-modified immunoprotein. Since complexes of several metal ions including zirconium (IV) and iron (III) form much stronger bonds than Y-90, specifications for chemical purity of Y-90 are necessarily strict for efficient labeling.

The Y-90 is formed by the decay of Sr-90 with a 30-year half-life. Y-90 decays with a 68-hour half-life to form non-radioactive zirconium (Zr). Even if the Sr-90 starting feed is free from other metallic impurities, Zr(IV) will continue to build up in the cow and will require separation from the purified Y-90.

There is a need in the art for a method capable of producing multi-curie quantities of chemically and radiochemically pure Y-90 on a weekly basis. Due to the need for highly purified Y-90 and the deficiencies in the current approaches in the art, there is a need for improved methods. The present invention fulfills this need and further provides other related advantages.

BRIEF SUMMARY OF THE INVENTION

Briefly stated, the present invention discloses a method of producing and purifying Y-90. The present invention provides a method to semi-continuously milk the Y-90 from a Sr-90 "cow". In an embodiment, the method provides purified Y-90, removes any traces of Sr-90 and Zr decay product, and converts the purified Y-90 to a suitable form (e.g., dilute hydrochloric acid), for example for cancer research and treatment. A unique chemical method of separation for Zr is disclosed herein and provides a zirconium clean-up step for the Y-90.

The method for purifying Y-90 from Sr-90, comprises the steps of: (a) dissolving a radioactive strontium nitrate salt comprising Sr-90 nitrate and Y-90 nitrate, in a solution comprising water; (b) evaporating the solution to incipient dryness to leave solids; (c) contacting the solids with greater than 80-wt % $HNO_3$, whereby Y-90 is dissolved in the acid solution and strontium is precipitated as a solid; and (d) separating the solids from the acid solution containing the Y-90, thereby purifying the Y-90. In one embodiment, the strontium nitrate salt in step (a) is a strontium salt other than nitrate that has been converted to strontium nitrate by the use of $HNO_3$. In one embodiment, steps (c) and (d) are repeated with the solids of step (d) and the acid solution from each step (d) is combined. In one embodiment, the acid solution of step (d) is evaporated to incipient dryness and steps (c) and (d) are repeated. In one embodiment, the method has additional step (e), comprising (e) contacting the acid solution of step (d) containing the Y-90 with a resin that removes strontium, thereby removing trace strontium if present from the Y-90. In one embodiment, the method has additional steps (e) and (f), comprising (e) replacing the $HNO_3$ in the acid solution of step (d) containing the Y-90, with HCl; and (f) contacting the HCl acid solution containing the Y-90 with a resin that removes zirconium, thereby removing zirconium if present from the Y-90. In one embodiment the method has additional steps (e) and (f), comprising (e) evaporating the solution containing the purified Y-90 to incipient dryness; and (f) dissolving the purified Y-90 with a solution of choice.

In one embodiment the method comprises the steps of dissolving the strontium nitrate "cow" comprised of Sr, Sr-90, Y-90 from the decay of Sr-90, and zirconium (Zr) from the decay of Y-90, in a water solution, evaporating the solution to incipient dryness, contacting the crystalline solids with greater than 80% to about 90-wt % (preferably about 85-90-wt % or at least 85-wt %) $HNO_3$ to precipitate the Sr as $Sr(NO_3)_2$, separating the solids from the acid solution containing the Y-90, and evaporating the solution to remove the acid from the Y-90 final purified product. Addition of a second, much smaller volume of 85-90-wt % or at least 85-wt % $HNO_3$, followed by a second solid-liquid separation is an optional step. If the Y-90 final product contains detectable traces of Sr-90, the acid solution may be passed through a small Sr-selective membrane (e.g., 3M Sr Rad disk) in the nitrate form. The Y-90 final purified product is evaporated to dryness and brought up in an acid solution for analysis and shipment, usually hydrochloric acid. If Zr is present in the final Y-90 product $HNO_3$ solution, the solution is converted to the HCl form and passed through a small anion exchange resin membrane to remove Zr(IV). If the Y-90 final product contains detectable traces of Sr-90, the HCl acid solution may be passed through a small Sr-selective membrane (e.g., 3M Sr Rad disk). The final Y-90 chloride solution is taken to dryness to remove the concentrated HCl. The purified Y-90 free of Sr-90, Zr and other unwanted ions is dissolved in dilute HCl or other acid as specified by the end user. The $Sr(NO_3)_2$ "cow" can be "remilked" as additional Y-90 becomes available from the decay of Sr-90.

These and other aspects of the present invention will become apparent upon reference to the following detailed description and attached drawings.

DETAILED DESCRIPTION OF THE INVENTION

The present invention provides a method of separating and purifying Y-90 from Sr-90. The method is efficient and economical. The impurities removed, including Zr, are not returned to the original Sr-90 source. Thus, the impurities do not continue to build up in the "cow." However, since Sr-90 is expensive, it is important to recover it for further use. In a particularly preferred embodiment, the trace of Sr (if present) in the separated Y-90 is removed. Y-90 preparations of purity heretofore unavailable are produced.

As shown by the disclosure herein, nitric acid concentrations from greater than 80-wt % to at least about 90-wt % are useful to separate and purify Y-90 from Sr-90. Further unexpectedly the solubility of Sr continues to decrease as the concentration of nitric acid continues to increase to about 90-wt %, rather than the minimum solubility of Sr being reached at a lower concentration of nitric acid. In the context of the method of the present invention, a concentration of nitric acid in the range typically from greater than 80-wt % to about 90-wt % may be used, with a range of at least 85-wt % or about 85-90-wt % being preferred. In an embodiment, the concentration of the nitric acid is at least 90-wt %. Any ranges disclosed herein include all whole integer ranges thereof (e.g., 85-90-wt % includes 85-89-wt %, 86-90-wt %, 86-89-wt %, etc.). If the nitric acid solution contains more than 86-wt % nitric acid, it is referred to as fuming nitric acid.

The initial Sr-90 "cow" may be in the form of $SrCO_3$ or other familiar forms, e.g., strontium nitrate or a strontium salt other than nitrate. $SrCO_3$, for example, is readily converted to $Sr(NO_3)_2$ by the addition of stoichiometric quantities of $HNO_3$. Accordingly, $Sr(NO_3)_2$ as the form of the initial Sr-90 "cow", or formed by conversion of a strontium salt other than nitrate to $Sr(NO_3)_2$ as the Sr-90 "cow", is the starting material for the method of the present invention. Sr-90 may be in a solid or liquid form of $Sr(NO_3)_2$. One of ordinary skill in the art in possession of the present disclosure will appreciate that there are a variety of ways to obtain $Sr(NO_3)_2$ as the Sr-90 "cow" for the method of the present invention. There are 0.00756 grams of Sr per Ci of Sr-90. There are $1.8 \times 10^{-6}$ grams of Y per Ci of Y-90. The isotopic composition of the Sr found is assumed to be approximately 20-wt % Sr-90 and therefore there are 0.038 g of total Sr per Ci of Sr-90. The gram ratio of total Sr to Y is approximate 21,000.

It may be desirable to augment the method of the present invention to remove a trace of Sr if present and the Zr, in order to purify and convert the Y-90 into an "ultra pure" final product. One of ordinary skill in the art of traditional ion exchange column methods will recognize that a number of organic resins have the potential to remove the trace of unwanted Sr and Zr from the Y-90 product. IBC SuperLig® 620, Eichrom Sr Resin®, Eichrom Ln Resin®, Eichrom TRU Resin® and BioRad AG 1-X8® are a few examples.

Alternatively, the 3M Empore™ anion exchange SR extraction disk and the 3M Empore™ Sr Rad disks are uniquely suitable for removal of Zr and for removal of trace Sr, respectively, and useful for a preferred embodiment of this invention. The disks are prepared and sold by 3M, St. Paul, Minn., and consist of a paper thin membrane containing either an anion exchange resin or cation exchange resin, incorporated into a disk or cartridge, and can be designed to be placed on a syringe barrel. The 3M Empore™ extraction disks for the removal of trace Sr and Zr are an effective alternative to conventional radiochemical sample preparation methods that use wet chemistry or packed ion exchange columns.

The exchange absorbing resin is ground to a very fine high-surface area powder and "is secured in a thin membrane as densely packed, element-selective particles held in a stable inert matrix of PTFE (polytrifluoroethylene) fibrils that separate, collect and concentrate the target radioisotope on the surface of the disk", in accordance with the method described in U.S. Pat. No. 5,071,610. The use of anion disks is described in U.S. Pat. No. 5,749,042. The 3M Empore™ Sr Rad disk is commercially sold for the quantitative determination of radio strontium in aqueous solutions.

In general, the solution containing the unwanted ion is passed through the paper thin extraction disk by placing the solution in a syringe barrel and forcing the solution through the disk with a plunger. The method takes from 10 seconds to 1 minute to complete. A second method is to place the extraction disk on a fritted or porous filter and forcing the solution through the disk by vacuum. The method is very fast and requires no ion exchange column system. A "sandwich" (placing two different types of web together and accomplishing two different chemical separation tasks at the same time) may also be used.

After the Sr-90 is separated from the Y, the residual Sr nitrate "cow" is stored to allow in-growth of additional Y-90 in the crystal structure of the Sr nitrate solid, from the decay of Sr-90. To "milk" additional Y-90 from the "cow", the $Sr(NO_3)_2$ solid is dissolved in water to release the Y-90 $(NO_3)_3$. The "Handbook of Chemistry and Physics", 31st edition, 1949, lists the solubility of $Sr(NO_3)_2$ (211.65 g/mole) as "100 g/100 mL $H_2O$ @ 90° C. and 40.1 g/100 mL $H_2O$ @ 0° C.". Experimental tests have verified these solubility values.

As described above, Y-90 is useful for radiotherapy (such as to treat malignancies). Where it is desired to target a radioactive substance (e.g., Y-90) to a tumor for therapy, Y-90 may be used as part of the production of conjugates wherein a targeting molecule is radiolabeled with Y-90 for targeted delivery of the Y-90 to tumor cells. For example, the Y-90 may be bound to a chelating compound (to form a chelate) either before or after attachment of the chelating compound (or chelate) to the targeting molecule. Examples of targeting molecules include antibodies, such as monoclonal antibodies. The method of the present invention provides purified Y-90 for these and other uses.

Detailed Description of Certain Preferred Embodiments

Figure 4:
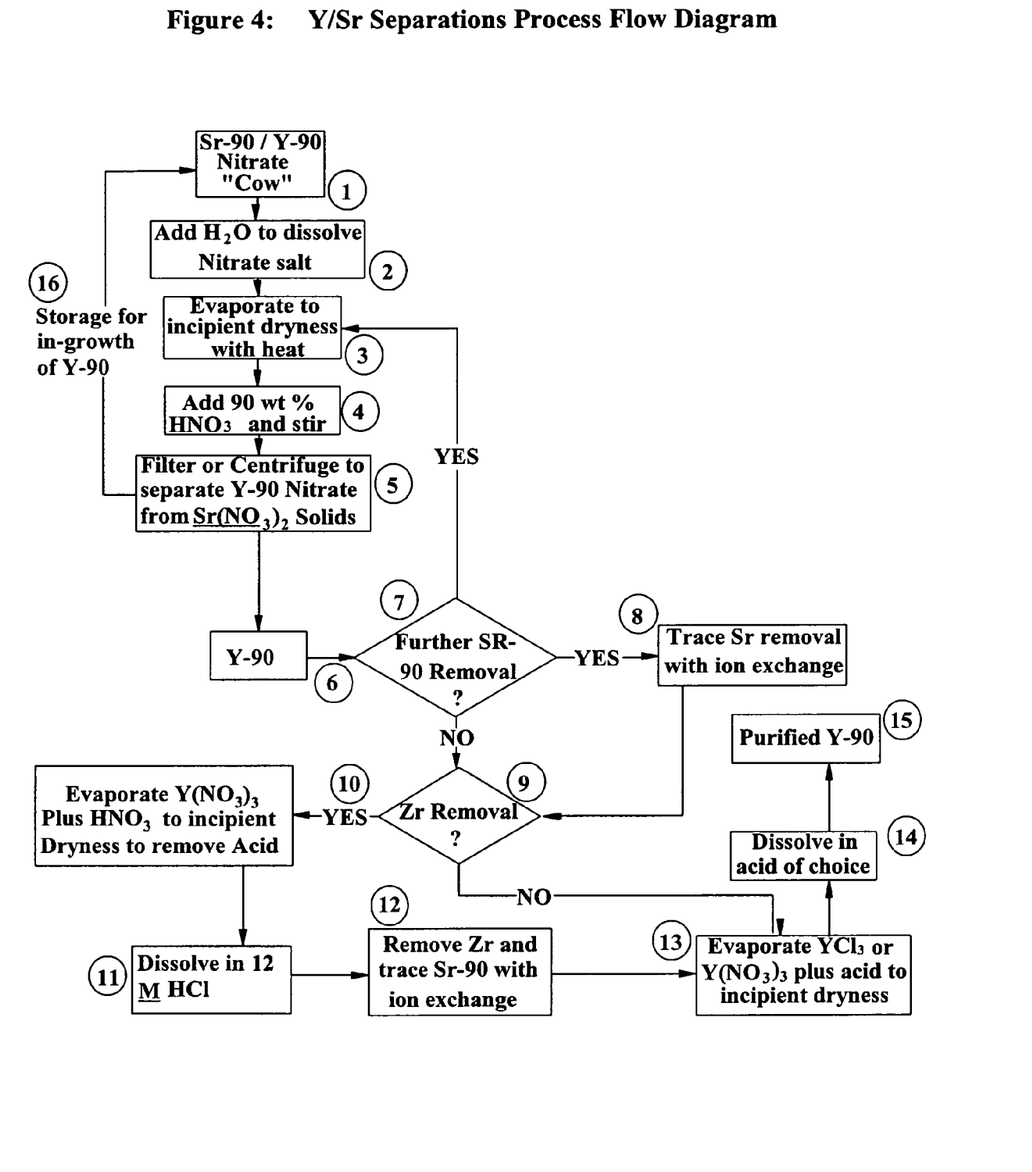
FIG. 4, entitled "Sr/Y Separations Process Flow Diagram", is a process flow diagram depicting the preferred embodiment of the process steps.

In accordance with preferred aspects of the invention, a preferred embodiment method of separation and purification of Y-90 is initially described with reference to FIG. 4. It comprises the steps of 1 obtaining a quantity of $Sr(NO_3)_2$ containing Sr, Sr-90 and its decay products comprised of Y-90 and Zr formed by radioactive decay of Y-90. The specific activity of Y-90 is ~5.48×10$^5$ Curies (Ci) per gram of yttrium. There are 0.00756 grams of Sr per Ci of Sr-90 and it is assumed that the Sr-90 is only ~20% of the total Sr and therefore there are 0.038 g of total Sr per Ci of Sr-90. To release the Y-90 from the $Sr(NO_3)_2$ crystal structure, it is assumed that the salt must be dissolved. This is accomplished 2 by the addition of water with stirring. The salt solution is then evaporated 3 to incipient dryness with heat. A small volume of 90-wt % $HNO_3$ is 4 added with stirring to precipitate $Sr(NO_3)_2$. The resulting precipitate is centrifuged or filtered to 5 recover the $Y(NO_3)_3$ and Zr in the filtrate. The Y-90 product is analyzed 6 for purity. If the Y-90 does not meet specifications 7 and contains a trace of Sr-90 and Zr, it is returned to complete steps 3-6. If the Y-90 product meets specifications 7, but still contains a trace of Sr-90, the nitric acid product 8 is passed through an ion exchange membrane filter (3M Sr Rad Disk). If the resulting Y-90 product 7 or 9 does not contain Zr, the $Y(NO_3)_3$ and $HNO_3$ are evaporated to incipient dryness 13 and redissolved in a dilute acid of choice 14 usually HCl as the final product 15. If the Y-90 meets specifications 7 but still contains Zr and traces of Sr-90, the nitric acid product solution is prepared for Zr removal 10. The $Y(NO_3)_3$, $Zr(NO_3)_4$ plus $HNO_3$ is evaporated 10 to incipient dryness to remove the acid. The resulting solids are 11 dissolved in concentrated 12M HCl. The $YCl_3$ solution 12 is passed through ion exchange membrane filters to remove Zr and any remaining traces of Sr-90. The $YCl_3$ solution plus HCl is evaporated 13 to incipient dryness. The purified Y-90 is dissolved 14 in dilute HCl as specified by the customer. The Y-90 is certified 15 for shipment. The Sr-90 "cow" is held in storage 16 to allow for in-growth of Y-90 and subsequent reuse.

The following Examples are offered by way of illustration and not by way of limitation.

EXAMPLES

Example 1

Solubility of Sr, Y and Zr in Nitric Acid

Figure 5:
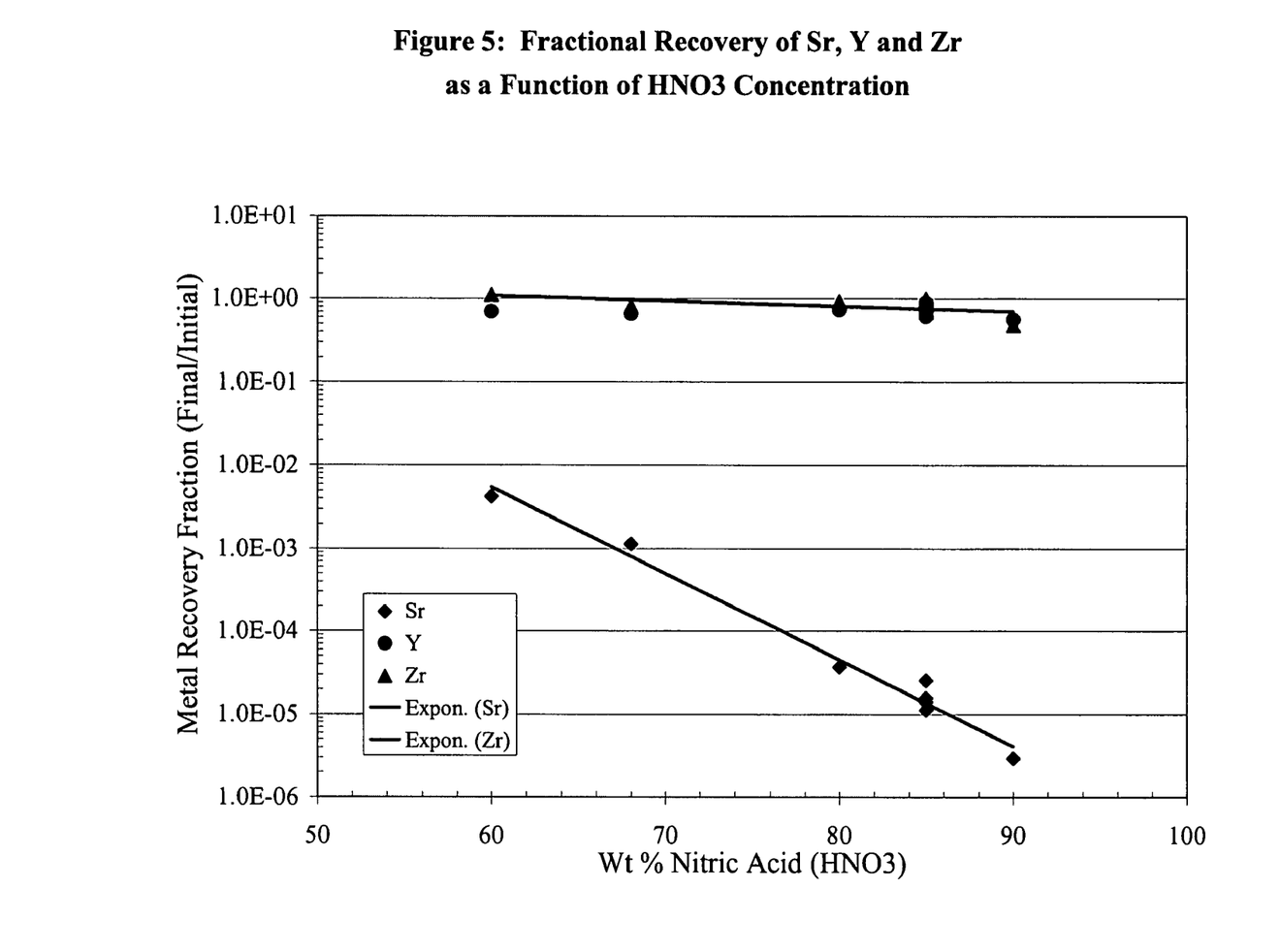
FIG. 5, entitled "Fractional Recovery of Sr, Y and Zr as a Function of Nitric Acid Concentration", is a diagram of the fractional recovery of Sr, Zr and Y as a function of the Wt % nitric acid.

A series of tests were completed to determine the solubility of Sr, Y and Zr as a function of nitric acid concentration. The results of this study are shown in FIG. 5, and outlined below.

Approximately 0.32 to 0.48 grams (g) of $Sr(NO_3)_2$ (equivalent to 0.13 to 0.2 g Sr), 10 micrograms (μg) of Y (equivalent to ~3.5 Ci Y-90), and 10 μg of Zr were contacted with 10 milliliter (mL) of 60 to 90-wt % $HNO_3$ for 30 minutes. The resulting solids and solution were filtered and the filtrate analyzed for Sr, Zr and Y. FIG. 5 shows the fractional recovery (final/initial) for Y, Zr and Sr. From the Figure it is readily apparent that both Y and Zr remain completely in solution (final/initial ~1.0) at all $HNO_3$ acid concentrations evaluated.

Figure 6:
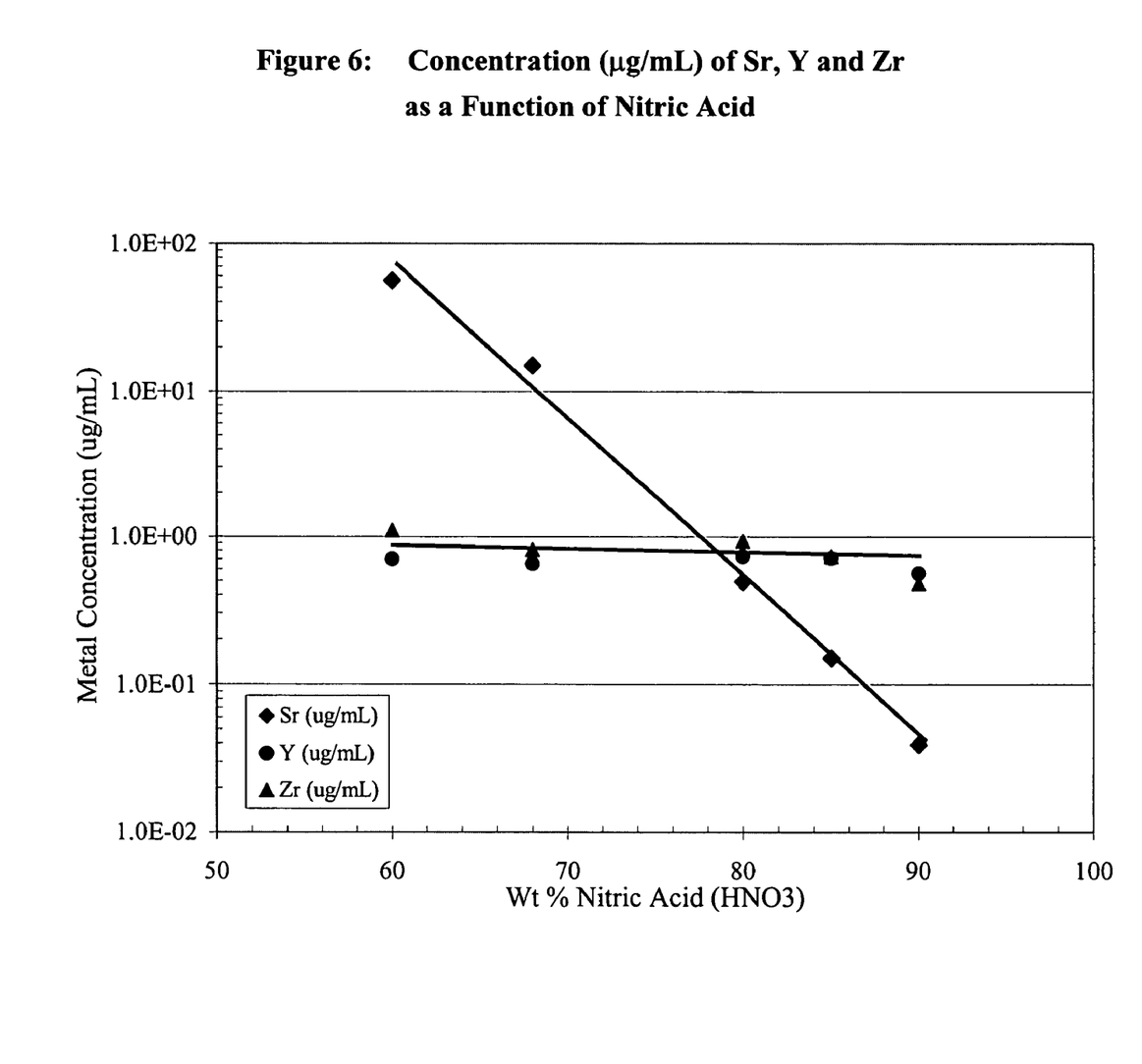
FIG. 6, entitled "Concentration (µg/mL) of Sr, Y and Zr as a Function of Nitric Acid Concentration", is a diagram of the Sr, Zr and Y mass solubility (µg/mL) as a function of the Wt % nitric acid.

The Sr, Y and Zr values found above in the aqueous filtrate were plotted as a function of their metal concentration in micrograms (μg) found per milliliter (mL) of filtrate, FIG. 6. The results show that under the test conditions at less than 75-wt % acid the Sr concentration (μg/mL) in solution is greater than Y (μg/mL). The two metal concentrations (μg/mL) are approximately equal at ~78-wt % acid. At higher acid strength the Sr is less than Y. At 90-wt %, the Y metal value is 14-times that of the Sr metal value.

Example 2

Removal of Trace Sr

3M Empore™ Test Conditions:

1. Make up 4 mL of 10M $HNO_3$ solution containing 80 μL each of 1000 μg Sr/mL, 1000 μg Y/mL and 1000 μg Zr/mL. Take a Sr Rad disk. Precondition with 10M $HNO_3$. Pass 1 mL of Sr solution through the disk. Pass 1 mL of 10M $HNO_3$ through the disk as a rinse. Submit 2 mL of the standard solution and 2 mL of the effluent for Sr, Y and Zr for analysis.
2. Make up 5 mL of 12M HCl solution containing 100 μL each of 1000 μg Sr/mL, 1000 μg Y/mL, and 1000 μg Zr/mL. Take a Sr Rad disk. Precondition with 12M HCl. Pass 1 mL of Sr solution through the disk. Pass 1 mL of 12M HCl through the disk as a rinse. Submit 2 mL of the standard solution and 2 mL of the effluent for Sr, Zr, and Y for analysis.
3. Take an anion exchange extraction disk that has been preconditioned with 12M HCl. Pass 1 mL of Zr solution (test 2) through the disk. Pass 1 mL of 12M HCl through the disk as a rinse. Use the 2 mL of the standard solution (test 2) above and 2 mL of the effluent for Zr, Sr and Y for analysis.
4. Make up 5 mL of 12M HCl solution containing 200 μL of 1000 μg Sr/mL, 100 μL of 1000 μg Y/mL, and 100 μL of 1000 μg Zr/mL. Take an anion exchange disk and place a Sr Rad disk on top as a "sandwich". Precondition with 12M HCl. Pass 1 mL of Sr solution through the disks. Pass 1 mL of 12M HCl through the disks as a rinse. Submit 2 mL of the standard solution for Sr, Zr, and Y analysis. Submit 2 mL of the effluent for Sr, Zr, and Y analysis.

TABLE 1

ANALYTICAL LABORATORY RESULTS

| 1. 10 M $HNO_3$ Standard | Sr Rad Disk | Fractional Recovery* |
|---|---|---|
| Sr, 18 μg/mL | <0.02 μg/mL | >1.2 × 10⁻³ |
| Y, 17 | 18 | 1 |
| Zr, 23 | 28 | 1 |
| 2. 12 M HCl Standard | Anion Disk | Fractional Recovery* |
| Sr, 33 μg/mL | 36 μg/mL | 1 |
| Y, 15 | 16.4 | 1 |
| Zr, 18 | 0.14 | 7.7 × 10⁻² |
| 3. 12 M HCl Standard | Sr Rad Disk | Fractional Recovery* |
| Sr, 17 μg/mL | <0.02 μg/mL | >1.2 × 10⁻³ |
| Y, 15 | 17.2 | 1 |
| Zr, 18 | 22 | 1 |
| 4. 12 M HCl Standard | "Sandwich" Sr Rad Disk + Anion Disk, | Fractional Recovery* |
| Sr, 33 μg/mL | <0.02 μg/mL | >6.1 × 10⁻⁴ |
| Y, 15 | 17.4 | 1 |
| Zr, 18 | 0.174 | 9.7 × 10⁻³ |

*FR = Final/Initial, Fractional Recovery

The above results show that the Sr Rad Disk is equally effective in recovery of Sr (Fractional Recovery=>1.2×10⁻³) for both 10M $HNO_3$ and 12M HCl. The Anion Disk was effective at the removal of Zr, FR=9.7×10⁻³.

Example 3

Y/Sr Separation Process

Approach:

1) A known weight of $Sr(NO_3)_2$ representing a Sr-90 "cow" is dissolved in water to release the $Y(NO_3)_3$ and $Zr(NO_3)_4$ and taken to incipient dryness with a heat source. An amount of 90-wt % $HNO_3$ is added to the near dry Sr nitrate salt. The majority of the Sr is precipitate based on its solubility as a function of the nitric acid concentration as $Sr(NO_3)_2$, while the Zr, Y, and traces of Sr nitrate remain in the $HNO_3$ filtrate.

2) The Y, Zr and traces of Sr in the $HNO_3$ filtrate are filtered or centrifuged to separate them from the $Sr(NO_3)_2$ salt. The filtrate is evaporated to incipient dryness. An amount of 90-wt % $HNO_3$ approximately 1/10th to 1/50th of that used above is added to the dried Y/Sr/Zr nitrate salts. The trace of remaining Sr will precipitate, while Zr and Y nitrate remain in the filtrate.

3) The filtrate containing about 100% of the Zr and Y, along with almost non-detectable levels of Sr is evaporated to incipient dryness. An amount of 12M HCl is added to dissolve and convert the dried Y/Zr nitrate salt to the chloride form.

4) The resulting Y/Zr chloride solution is passed through a 3M anion exchange "web" filter to remove the Zr(IV) as a chloro-complexed anion. The Y chloride final product is passed through a 3M Sr "web" filter to remove the minute traces of Sr to non-detectable levels.

5) The resulting purified yttrium chloride solution is taken to dryness to remove any trace of nitrate that may have accompanied the dried nitrate salt (step #4), and then is taken up in a dilute acid solution (usually HCl) at the acid and radiochemical strength desired by the end user.

6) If Zr is not present (2) the nitric acid filtrate containing ~100% of the Y-90, along with almost non-detectable levels of Sr-90, is passed through a 3M Sr Rad filter to remove the minute traces of Sr-90 to non-detectable levels.

7) The resulting purified yttrium nitrate solution (6) is taken to dryness to remove any trace acid that may have accompanied the dried nitrate salt and then is taken up in a dilute acid solution (usually HCl) at the acid and radiochemical strength desired by the end user.

Example Y/Sr Separation Process:

The Y-90 separation process was simulated using non-radioactive $Sr(NO_3)_2$ and standard solutions of $Y(NO_3)_3$ and $Zr(NO_3)_4$. Two Sr "cow" concentrations along with varying the acid concentrations and volumes are shown below to demonstrate a variety of typical results, i.e. 3.5 Ci Sr-90 [0.34 g $Sr(NO_3)_2$] and 35 Ci Sr-90 [3.4 g $Sr(NO_3)_2$].

TABLE 2

SEPARATION OF Sr

| | Sample | | | | |
|---|---|---|---|---|---|
| | #1 | #2 | #2-3 | #4 | #5 |
| Conditions | | | | | |
| Temperature, °C. | 22 | 21 | 22 | 22 | 22 |
| Sr, g | 0.132 | 0.141 | 4.06 μg | 0.141 | 1.41 |

TABLE 2-continued

SEPARATION OF Sr

| | Sample | | | | |
|---|---|---|---|---|---|
| | #1 | #2 | #2-3 | #4 | #5 |
| $Sr(NO_3)_2$, g | 0.319 | 0.34 | — | 0.34 | 3.4 |
| Total Volume, mL | 10 | 10.59 | 1 | 5.27 | 10.6 |
| 90 w % $HNO_3$, mL | 10 | 10 | 1 | 5 | 10 |
| $H_2O$, mL | 0 | 0.59 | 0 | 0.27 | 0.6 |
| Wt % $HNO_3$ | 90 | ~85 | 90 | ~85 | ~85 |
| Contact time, min | 30 | 30 | 30 | ~30 | 30 |
| Recovery-Filtrate | | | | | |
| Total Sr, ug | 0.39 | 4.06 | 0.14 | 1.20 | 1.24 |
| Initial Sr, ug | $1.32 \times 10^5$ | $1.41 \times 10^5$ | 4.06 | $1.41 \times 10^5$ | $1.41 \times 10^6$ |
| *Fractional Recovery | $2.95 \times 10^{-6}$ | $2.87 \times 10^{-5}$ | $3.45 \times 10^{-2}$ $9.9 \times 10^{-7}$ (#2 + #3) | $8.51 \times 10^{-6}$ | $8.79 \times 10^{-6}$ |

*Final/Initial

1. The results show a variety of conditions:
    a. Test #1 was competed at 90-wt % $HNO_3$ with a Sr FR=$2.95 \times 10^{-6}$
    b. Test #2 was completed at ~85-wt % $HNO_3$ with a Sr FR=$2.85 \times 10^{-5}$, a factor of 10 less than (a)
    c. Test #2-#3 took the recovery fraction of 4.06 μg Sr from #2 to dryness and contacted it with 1 mL of 90-wt % $HNO_3$ to provide for an additional Sr FR=$3.45 \times 10^{-2}$. Combining #2 and #3 provided an overall Sr FR=$9.9 \times 10^{-7}$
    d. Test #4 was completed using only 5 mL of 85-wt % $HNO_3$ with a Sr FR=$8.51 \times 10^{-6}$, as compared to using 10 mL acid (#2). Cutting the acid in half increased the Sr FR by a factor of 3.3.
    e. Test #5 was completed at ~85-wt % $HNO_3$ but the Sr concentration was increased 10-fold to simulate a 35 Ci Sr-90 "cow" [3.4 g $Sr(NO_3)_2$], increasing the Sr FR=$8.89 \times 10^{-6}$.
2. The Y and Zr were found with a trace of Sr in the filtrate.
3. Taking the above filtrate Sr FR results and applying an additional Sr Fractional Recovery of $1.2 \times 10^{-3}$ as demonstrated in Table 1 (using the 3M Empore™ Sr Rad disk), all of the results meet or exceed the goal of Sr-90/Y-90 separation factors of less than $1 \times 10^{-8}$.
4. Extrapolating the current results #5 (FR=$8.79 \times 10^{-6}$) for 35 Ci and #2 (FR=$2.87 \times 10^{-5}$) for 3.5 Ci, changed the FR by a factor of 3.2 and shows the advantage of using much larger "cow", i.e., 350 Ci's.

Example 4

Y-90/Sr-90 Radiochemical Separation Process

Approach:

1) A ~3 Curie Sr-90 "cow" containing approximately 195 milligrams of $Sr(NO_3)_2$ was taken to incipient dryness in a quartz bottle.

2) The "cow" was dissolved in ~4 milliliters (mL) of distilled water to release the Y-90 from the strontium nitrate crystal structure.

3) The resulting solution was analyzed to determine the Sr-90 content. Sample 1.

4) The water solution was taken to incipient dryness with heat and the salt was allowed to cool to ~25° C.

5) Approximately 5-mL of 90-wt % $HNO_3$ was added to the dry salt with stirring. After 60-minutes of stirring, the precipitated strontium nitrate salts were allowed to settle out of solution for 30-minutes.

6) The clear solution above the precipitate was removed using a transfer pipette.

7) The ~5-mL of Y-90 Initial solution was placed in a syringe which was attached to a 0.2 μm filter to remove any unwanted Sr-90 solids.

8) The filtered solution was sampled for Y-90 and trace Sr-90. Sample 2.

9) The resulting 5-mL of Y-90 Initial solution was diluted with 5-mL of distilled water with stirring to reduce the acidity to approximately 10 molar nitric acid.

10) The diluted 10-mL of solution was transferred to a syringe attached to a 13-mm Sr Rad Disk filter to remove additional traces of Sr-90.

11) The solution was filtered through the syringe filter into a clean vial marked "Y-90 Final Product".

12) The Y-90 final product was analyzed to determine the Sr-90 content. Sample 3.

Final Results:

| # | Identification | Sr-90, Curies/sample | Y-90, Curies/sample | Ratio, Sr-90/Y-90 |
|---|---|---|---|---|
| 1 | Sr-90 "Cow" | 3.00 | | |
| 2 | Y-90 Initial | 5.88E−5 | 2.11E0 | 2.8E−5 |
| 3 | Y-90 Final Product | 9.34E−8 | 2.11E0 | 4.4E−8 |

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention.

The invention claimed is:

1. A method for purifying Y-90 from Sr-90, comprising the steps of:
   (a) dissolving a radioactive strontium nitrate salt comprising Sr-90 nitrate and Y-90 nitrate, in a solution comprising water;
   (b) evaporating the solution to incipient dryness to leave solids;
   (c) contacting the solids of step (b) with greater than 80-wt % $HNO_3$ solution, whereby Y-90 is dissolved in the $HNO_3$ solution and strontium is precipitated as a solid; and
   (d) separating the solids of step (c) from the $HNO_3$ solution containing the Y-90, thereby purifying the Y-90.

2. The method according to claim 1 wherein the concentration of the nitric acid in step (c) is 85-90-wt %.

3. The method according to claim 1 wherein the concentration of the nitric acid in step (c) is at least 85-wt %.

4. The method according to claim 1 wherein the strontium nitrate salt in step (a) is a strontium salt other than nitrate that has been converted to strontium nitrate by the use of $HNO_3$.

5. The method according to claim 1 whereby steps (c) and (d) are repeated with the solids of step (d) and the $HNO_3$ solution from each step (d) is combined.

6. The method according to claim 1 whereby the $HNO_3$ solution of step (d) is evaporated to incipient dryness and steps (c) and (d) are repeated.

7. The method according to claim 1 wherein the solids of step (d) are subjected to the steps of:
   (i) storing the solids to allow additional Y-90 to form from decay of Sr-90;
   (ii) dissolving the solids in a solution comprising water; and
   (iii) repeating steps (b), (c) and (d) of claim 1.

8. The method according to any one of claims 1-7 having additional step (e), comprising (e) contacting the $HNO_3$ solution of step (d) containing the Y-90 with a resin that removes strontium, thereby removing trace strontium if present from the Y-90.

9. The method according to any one of claims 1-7 having additional steps (e) and (f), comprising (e) converting the $HNO_3$ solution of step (d) containing the Y-90, to a HCl acid solution; and (f) contacting the HCl acid solution containing the Y-90 with a resin that removes zirconium, thereby removing zirconium if present from the Y-90.

10. The method according to any one of claims 1-7 having additional steps (e) and (f), comprising (e) evaporating the solution containing the purified Y-90 to incipient dryness; and (f) dissolving the purified Y-90 with a solution of choice.

11. The method according to claim 8 having additional steps (f) and (g), comprising (f) evaporating the solution containing the purified Y-90 to incipient dryness; and (g) dissolving the purified Y-90 with a solution of choice.

12. The method according to claim 9 having additional steps (g) and (h), comprising (g) evaporating the solution containing the purified Y-90 to incipient dryness; and (h) dissolving the purified Y-90 with a solution of choice.

* * * * *